Dec. 18, 1923.                                             1,478,052
J. W. OLIVER
SAWING MACHINE
Filed Nov. 19, 1919          7 Sheets-Sheet 1
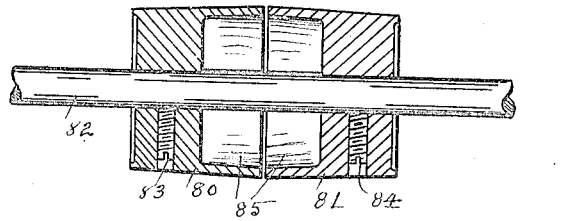
Fig. 9.
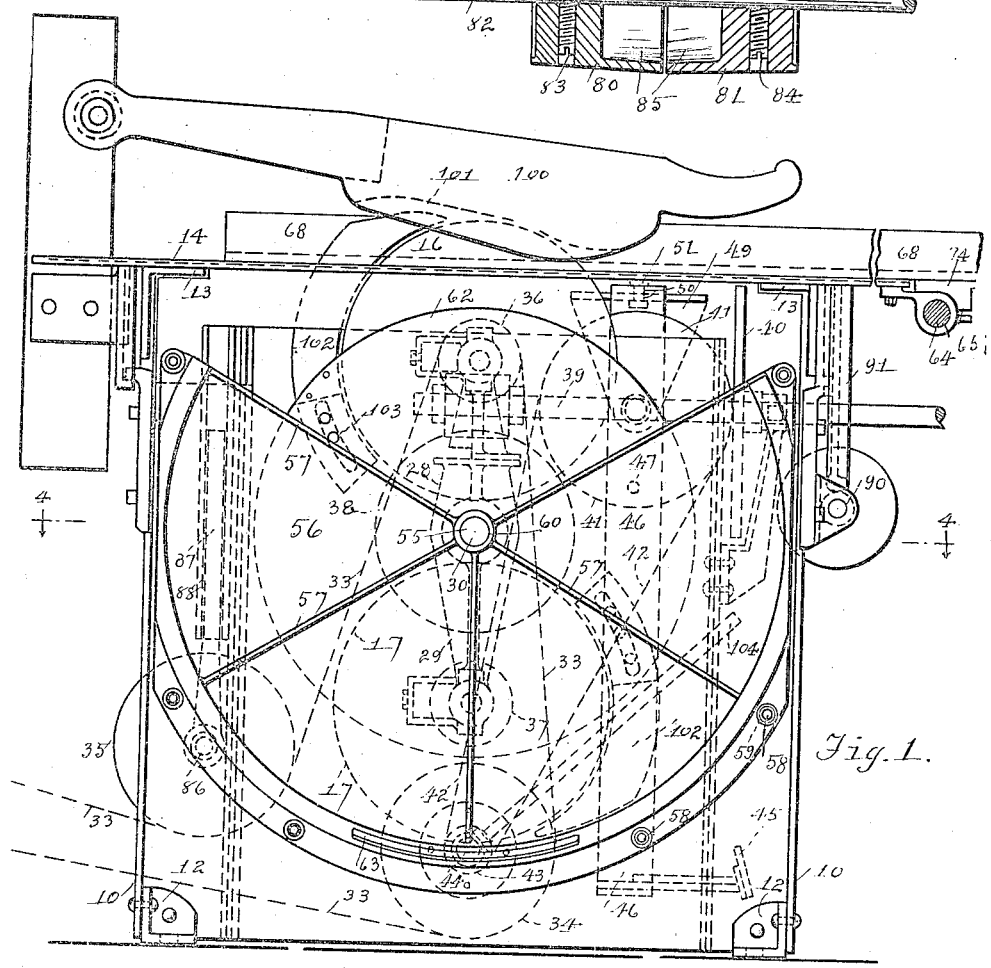
Fig. 1.
Fig. 5.    Fig. 6.
Witness:
Geo. L. Chase
Inventor:
Joseph W. Oliver
By Cyrus W. Rice
Attorney

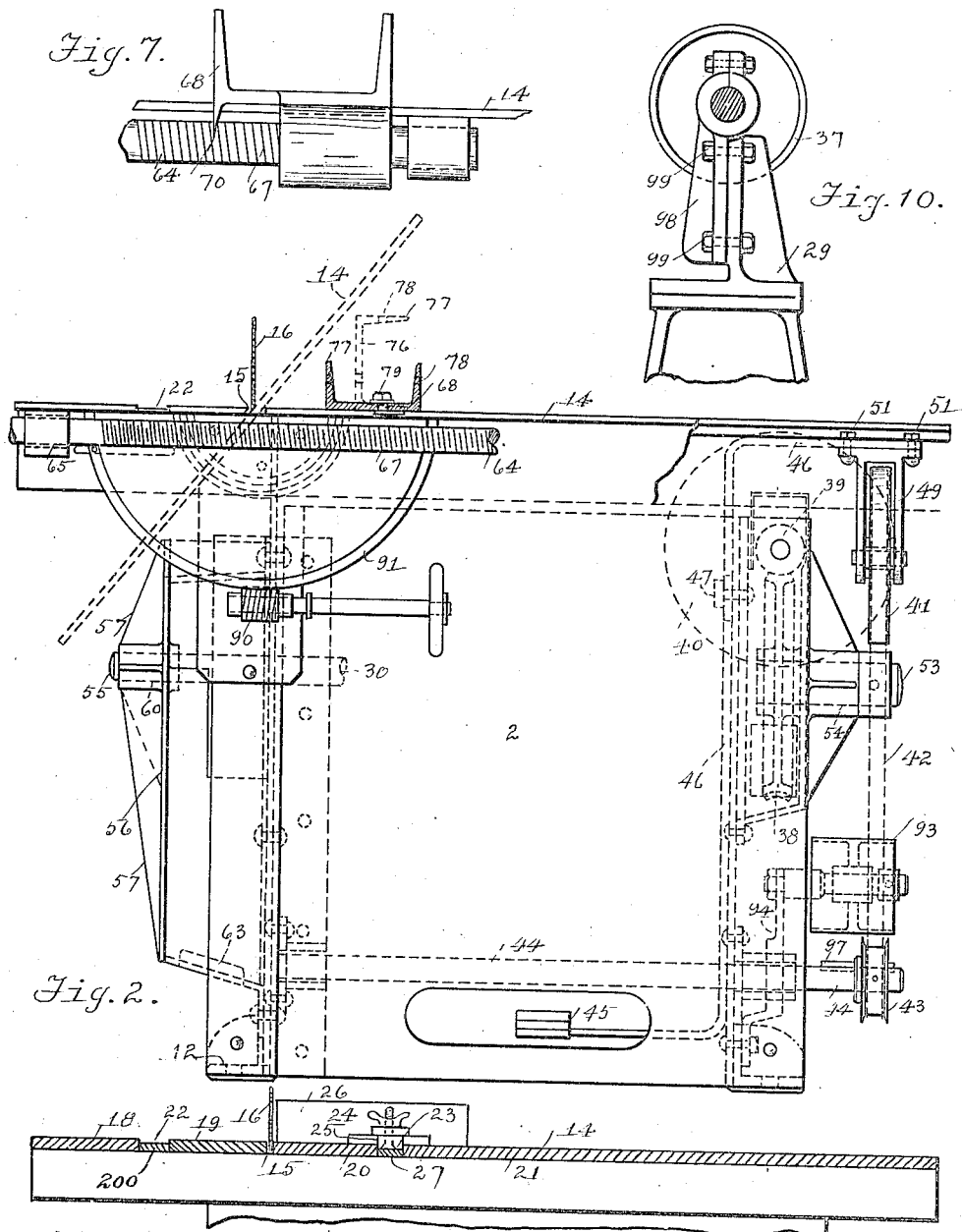

Dec. 18, 1923.

J. W. OLIVER 1,478,052

SAWING MACHINE

Filed Nov. 19, 1919

Witness:
Geo. L. Chapel

Inventor:
Joseph W. Oliver
By Cyrus W. Rice
Attorney

Dec. 18, 1923.

J. W. OLIVER 1,478,052

SAWING MACHINE

Filed Nov. 19, 1919     7 Sheets-Sheet 5

Witness:
Geo. L. Chapes

Inventor:
Joseph W. Oliver
By Cyrus W. Rice
Attorney

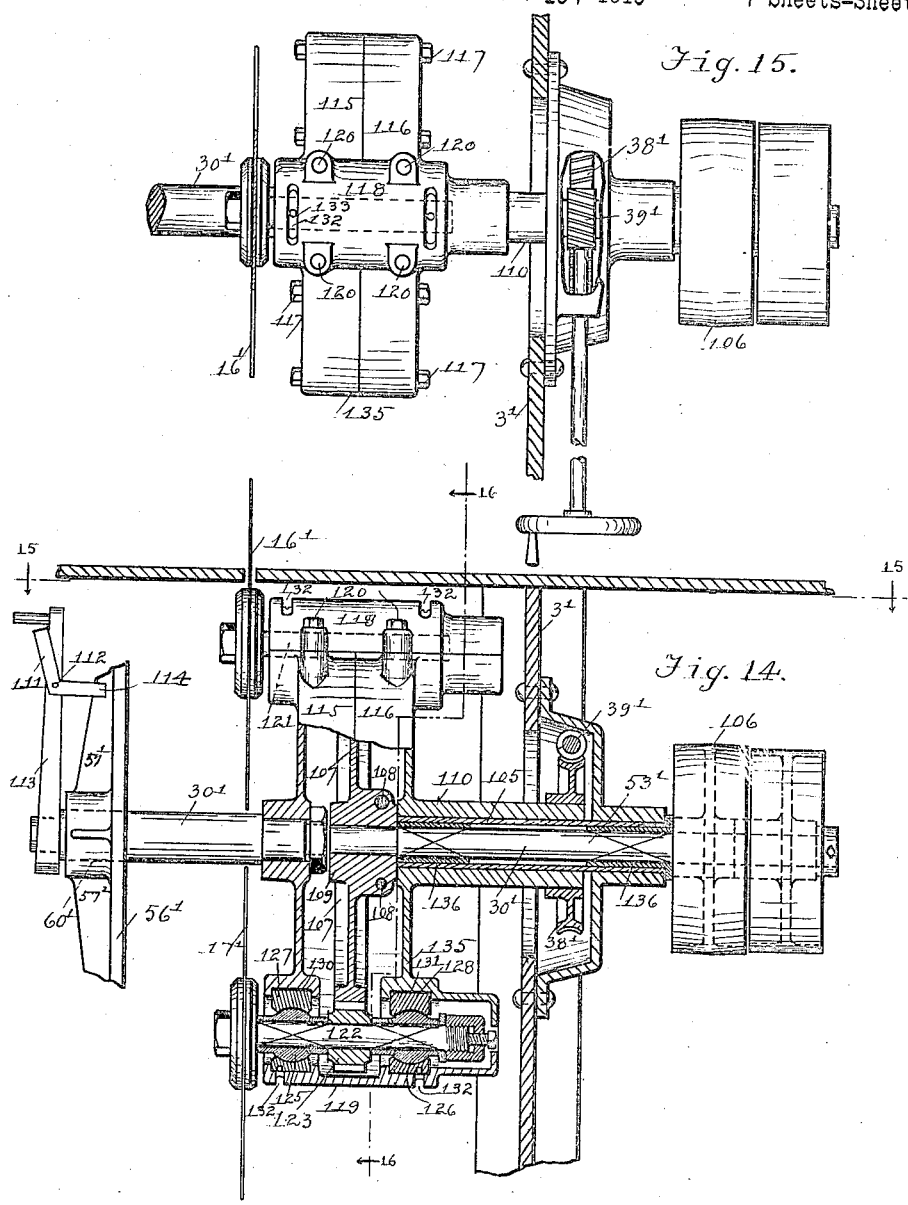

Dec. 18, 1923.

J. W. OLIVER 1,478,052

SAWING MACHINE

Filed Nov. 19, 1919     7 Sheets-Sheet 7

Witness:
Geo. L. Chapel

Inventor:
Joseph W. Oliver
By Cyrus W. Rice
Attorney

Patented Dec. 18, 1923.

1,478,052

UNITED STATES PATENT OFFICE.

JOSEPH W. OLIVER, OF GRAND RAPIDS, MICHIGAN.

SAWING MACHINE.

Application filed November 19, 1919. Serial No. 339,141.

*To all whom it may concern:*

Be it known that I, JOSEPH W. OLIVER, a citizen of the United States, residing at Grand Rapids, in the county of Kent and State of Michigan, have invented new and useful Improvements in Sawing Machines, of which the following is a specification.

The present invention relates to sawing machines; and one object thereof is to provide a machine of that character having a rotatable carrier on which are mounted rotatable saws, and having improved means for rotating both the carrier and the saws from the same source of power; a further object is to provide improved means for rotating the saws; a further object is to provide improved means for supporting and adjusting the axis of said carrier.

These and any other objects hereinafter appearing are attained by, and the invention finds preferable embodiment in, the structure hereinafter particularly described and illustrated by the accompanying drawings, in which:—

Figure 1 is a left-hand side view of a sawing machine;

Figure 2 is a front view thereof;

Figure 5 is a side view (enlarged) of a work-guiding member illustrating the mounting thereof on the machine;

Figure 6 is a front end view of the same;

Figure 7 is a front end view of a modified construction of said member and its mounting;

Figure 8 is a vertical sectional view of the work-supporting table, illustrating a modified construction thereof;

Figure 9 is a longitudinal central sectional view of a belt-carrying pulley;

Figure 10 is an end view of such a pulley illustrating an adjustable mounting for its bearings;

Figure 14 is a view, partly in vertical central section, of a modified construction of parts of the sawing machine wherein the saws are rotated by gears;

Figure 15 is a sectional view of a portion of the same, taken on a horizontal plane corresponding to line 15—15 of Fig. 14;

Figure 13:
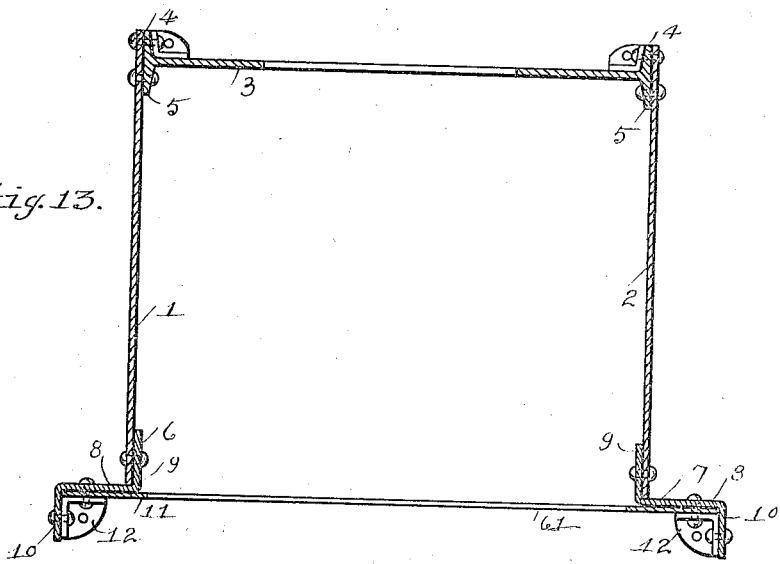
Figure 13 is a sectional view of the same taken on a horizontal plane corresponding to line 13—13 of Figure 12.
Figure 12:
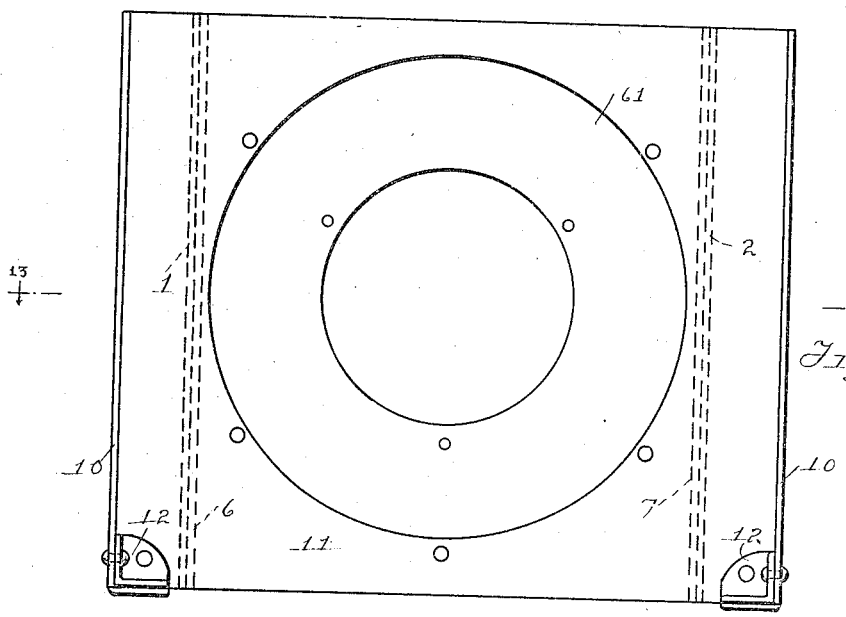
Figure 12 is a front view of the frame or column whereby the machine is supported.
Figure 17:
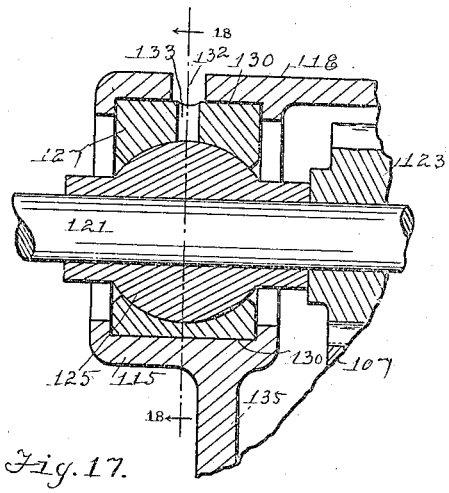
Figure 17 is an axial sectional view (much enlarged) of a bearing for the saw's axis and of a mounting for said bearing.
Figure 18:
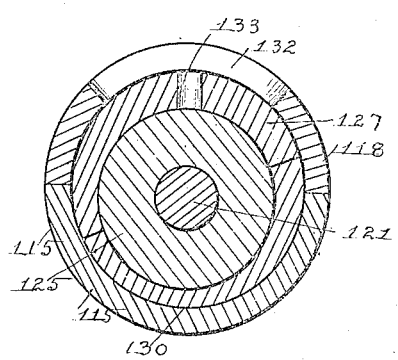
Figure 18 is a transverse sectional view of the same, taken on a vertical plane corresponding to line 18—18 of Figure 17.
Figure 16:
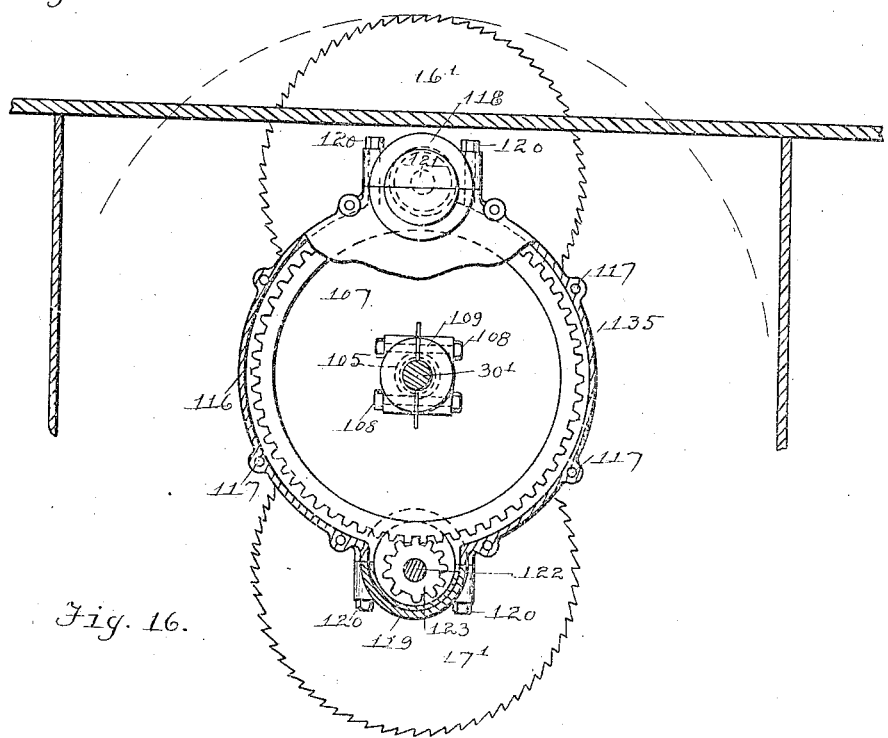
Figure 16 is a sectional view of a portion of the same, taken on vertical planes corresponding to line 16—16 of Figure 14.

In the embodiment of the invention chosen for illustration by the drawings and for detailed description in the body of this specification, the sawing machine has a supporting frame or column, particularly shown in Figures 12 and 13, comprising a pair of oppositely disposed vertical side plates 1, 2, a third vertical plate 3 having adjacent each vertical edge a pair of vertical flanges 4, 5 extending horizontally in opposite directions, one pair of said flanges being secured to the inner side of one of said side plates and the other pair being secured to the inner side of the other side plate; this frame or column also comprises a pair of vertical Z-bars 6, 7 each of which has a middle portion 8 and vertical flanges 9, 10 extending horizontally in interrelatively opposite directions from said middle portion, one of the flanges 9 of one Z-bar being secured to the inner side of one of the side plates and one of flanges 9 of the other Z-bar being secured to the inner side of the other side plate; the frame or column also comprises a fourth vertical plate 11 secured to the middle portion 8 of both Z-bars; corner pieces 12 are also shown, they being secured to the fourth plate 11 and one of them being secured to the other flange 10 of one Z-bar and the other corner piece being secured to the other flange 10 of the other Z-bar. These vertical plates are preferably of sheet steel and the means for securing the same in place are preferably bolts or rivets as shown.

Secured to the upper end of the column or frame, (as to its horizontal flanges 13) is the work-supporting table designated generally 14, having a slit 15 therethrough adapted to receive the upper portion of one or the other of the circular saws 16, 17. This table, as particularly shown in Figure 8, is formed in sections 18, 19 and 20, 21, the adjacent edges of 18 and 19 and the adjacent edges of 20 and 21 being spaced apart parallelly, in order to provide guiding grooves 22, 23 in which a suitable work guide 24 may be slid parallelly with the saw. This work guide may be of common form having a guided portion 25 longitudinally slidable in said groove and a work engaging portion 26 inclined at a desired angle to the portion 25. Filling pieces 27, 200 whose upper sides are lower than the upper side of the table are secured to the upper end of the column or frame between adjacent edges of said sections in order to prevent saw dust, etc. from falling on the mechanism underneath the table. It will be seen that an improved and very simple method of forming guiding grooves for the work guide is thus provided.

Figure 4:
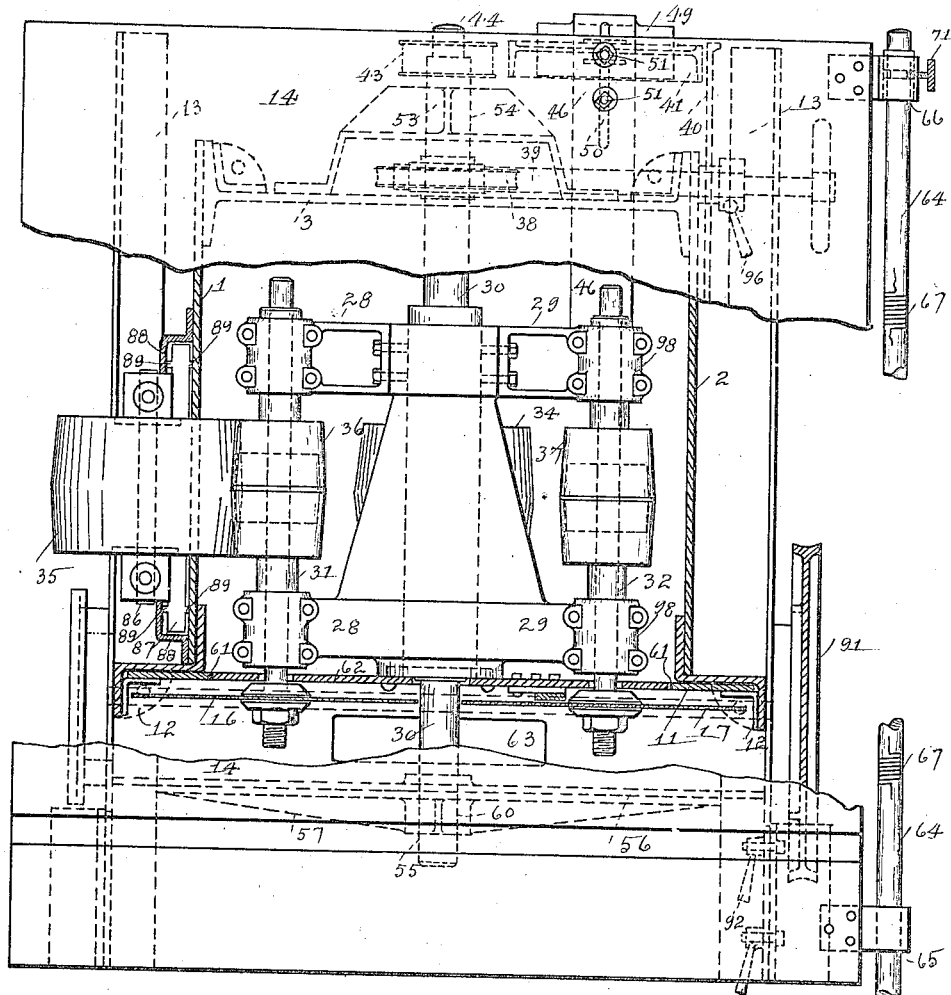
Figure 4 is a plan view of said machine, the middle part thereof being broken away to show lower parts, some of which are seen in horizontal section taken on a plane corresponding to line 4—4 of Figure 1, the carrier of the saws being shown in horizontal position in this view.

A carrier comprising two pairs of radial arms 28, 29 and mounted on a central rotatable arbor 30, has bearings in which the shafts 31, 32 of the circular saws 16, 17, rotate. As shown, these shafts are disposed on opposite sides of the arbor, and are rotated by suitable means. In Figures 1, 2, 3 and 4 such means comprise a belt 33 carried on the pulley 34, the belt tightening pulley 35 and one or the other or both of the pulleys 36, 37, on the shafts 31, 32 respectively. When the arbor is turned to the position best seen in Figure 1 this belt is carried on the pulley 36 thus driving the saw 16: When however the radial arms 28, 29 are in horizontal position (as shown in Figure 4) it will be seen that this belt is carried by both the pulleys 36 and 37. The arbor 30 is rotated to carry one or the other of the saws into the position in which saw 16 is shown in Figure 1, by the same means which are employed for driving the saws themselves, such means as shown in Figures 1, 2, 3 and 4 being the belt 33. This rotating of the arbor 30 is attained through the said driving means 33 by the following mechanism: The arbor 30 carries a wheel whereby the arbor is rotated, such wheel being the worm wheel 38 rotated by a rotatable element, the worm 39. This worm is rotated by its shaft's disk portion 40, which disk portion is rotated by a second wheel 41 driven by a belt 42 carried thereon and on the pulley 43 on the shaft 44 carrying the pulley 34. This second wheel 41 is movable into operative engagement with the disk portion 40 of the rotatable element or worm 39 by suitable means, as by pressing the pedal 45 of the lever 46 fulcrumed at 47, on which lever the said second wheel 41 is rotatably carried. This swinging of the lever by the pedal, against the pressure of a suitable spring 48, presses the second wheel 41, or (what is equivalent thereto) the belt 42 carried thereby, into said operative frictional engagement with the disk portion 40 of the worm element 39 and thus the arbor 30 is rotated.

In order that the arbor 30 may be rotated at different speeds although the driving movement of the belt 33 remains constant, the second wheel 41 is carried by the lever 46 in such manner that said second wheel may be moved on the lever toward and away from the axis of the disk portion 40 of the worm element 39. This end is attained by the following means: This second wheel 41 is rotatably mounted on its bearing member 49 having a slot 50 therethrough receiving a screw bolt 51 whereby the member 49 is slidably secured to the upper end of the lever. The worm element 39 may also be turned to rotate the arbor 30 by hand operated means, the hand wheel 52 on the worm shaft.

One end 53 of the arbor 30 has its bearing 54 at the right-hand side of the frame or column, and its other end 55 has its bearing 60 in a plate 56 (preferably provided with outwardly extending strengthening ribs 57) at the left-hand side of the machine. This plate 56 is detachably secured to the frame by suitable bolts 58 extending through orifices 59 adjacent the edge of said plate. These orifices are of greater diameter than the bolts 58 passing therethrough, so that the plate may be adjustably secured to the frame in such position as to properly adjust the arbor's axis.

The fourth vertical plate 11 of the column has a circular opening 61 therethrough closed by a circular plate 62 mounted on the carrier. The saws are outside this plate 62 as shown, and the sawdust is confined between the plates 56 and 62 and is discharged through a suitable opening 63 in plate 56. It will be seen that the parts may be easily assembled, the arbor 30, the carrier and saws being inserted through the opening 61, the end 53 of the arbor being thrust into its bearing 54, the arbor's other end 55 being inserted into its bearing 60, and the plate 56 being adjusted by its fastening bolts 58 on the column or frame.

A rod 64, circular in cross section, is turnably mounted in bearings 65, 66 on the frame or work-supporting table. This rod has a graduation 67 in helical form. A work-guiding member 68 is slidably and turnably mounted, by its bearing 69, on the rod, and is slidable in said bearing along the face of the table parallelly to the saw's axis. This member 68 has a suitable finger or pointer 70 whereby its position on the rod may be determined by reference to the rod's graduation. It will be seen that by means of this helically disposed graduation, a nice adjustment of the member 68 may be attained; for if the rod be turned, say half way around in its bearings 65, 66, a graduation of half the distance between adjacent turns of the helix will be indicated. This rod may be clamped in desired position by a set screw 71. The bearing 69 is preferably a split bearing as particularly shown in Figures 5 and 6. The two portions 72, 73 of the bearing block 74 are drawn together by a screw 75 to clamp the member 68 on the rod 64. It will be seen that, this bearing being loosened, the member 68 may be swung over on the rod 64 to a vertical position in front of the machine.

As particularly shown in Figure 6, the work-guiding member 68 has a body portion 76 and one or more narrower side portions 77 angularly disposed relatively to said body portion. Each of these portions 76 and 77 has an orifice 78 extending therethrough adapted to receive a screw bolt 79 for securing said member in fixed position. This work-guiding member may therefore be fastened at its body portion to the bearing block 74 or by one of its side portions, as may be desired to provide a work-guiding surface of less or greater height respectively. Two positions of said work-guiding member, one in solid lines and the other in dotted lines, are seen in Figure 2.

As particularly shown in Figure 9, the several pulleys may comprise lateral sections 80, 81, one or the other or both of which may be adjustable on their shaft 82 axially, as by the set screws 83, 84. Inasmuch as the entire pulley is thus divided into lateral portions severally secured to the shaft by said set screws, it will be seen that the length of that portion of each section which engages the shaft is less than the combined length of the shaft-engaging portion of a single-member pulley, and that therefore the biting action of the inner end of the set screws on the shaft has less tendency to bend the shaft out of alignment: furthermore, the adjacent sides of the pulley sections being hollow as seen at 85 the length of shaft engaging portion of each section is reduced. The sections are spaced apart as shown so that the air between the pulley and the belt carried thereon may readily pass out between the sections.

The idling belt-tightener pulley 35 is pivotally mounted at 86 on a block 87 slidable in a vertical guide 88 as particularly shown in Figure 4. The portion of said block thus slidably engaging the guide is provided with narrow outward extensions 89, so that this block may be more easily fitted to the guide by dressing down the extremities of these extensions than would be possible if the entire sides of this block should require such fitting and dressing.

Figure 3:
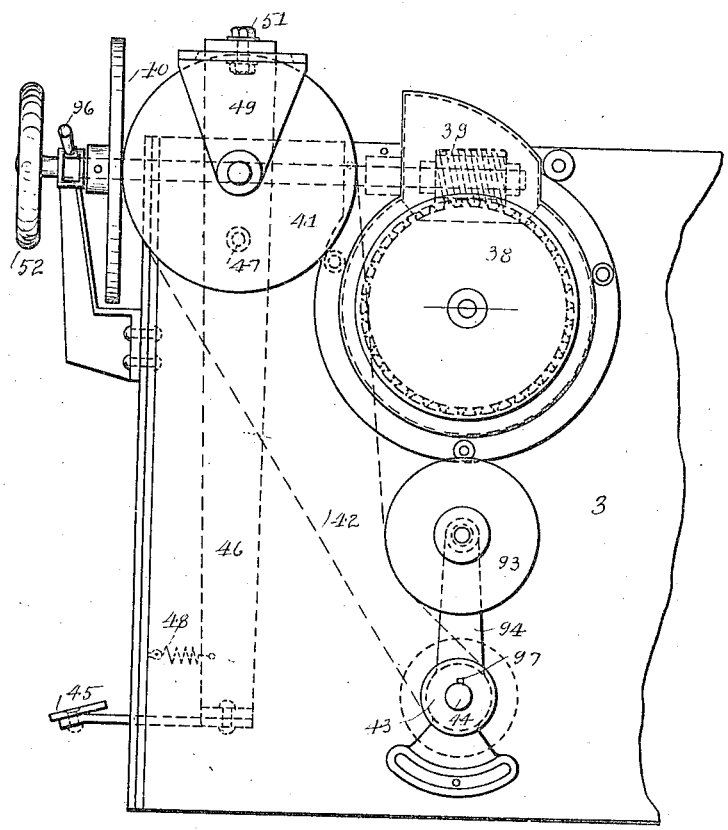
Figure 3 is a right-hand side view of the same.
Figure 11:
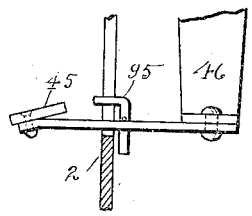
Figure 11 illustrates a means for holding a lever in swung position.

The work-supporting table or a portion thereof may be tilted and held in tilted position by the worm 90, engaging the worm sector 91 fixed to the table's under side. The portion of this table at the left-hand side of the saws may be slid away from the saws, to facilitate their assembling on their shafts, and may be held in normal position by suitable clamps 92. An idler belt-tightening pulley 93 pivoted on an arm 94 fulcrumed on the shaft 44 is shown for the purpose of tightening the belt 42. A pin 95 (Figure 11) may be inserted into a suitable orifice in the lower part of the lever 46 to hold the second wheel 41 in driving position to rotate the disk portion 40 of the worm element 39.

A clamp 96 may be employed to lock the shaft of the worm-element 39 in desired adjustment. The pulley 43 is splined at 97 on its shaft so that it may be moved axially thereon by the belt 42 as the second wheel 41 is moved axially. The bearing blocks 98 for the saws' shafts 31, 32, carried by the radial arms 28, 29 are adjustable on said arms as particularly shown in Figure 10 (in order to properly align said shafts) by bolts 99 passing through orifices in the blocks 98 and secured to the arms 28, 29, such orifices being of greater diameter than the bolts passing therethrough. A pivotally mounted guard 100 having a kerf 101 admitting the upper portion of the saw is shown in Figure 1. Guides 102 adapted to enter the saw kerfs in the work, and being adjustably mounted at 103 on the circular plate 62 are also shown in Figure 1. An oiling tube 104 for supplying oil to the bearing of shaft 44 appears in Figure 1.

In Figures 14, 15, 16, 17 and 18 a modified construction of parts of the sawing machine is shown, in which the saws 16' and 17' are driven by gears instead of by a belt. In these views, the arbor 30' journalled at one end 60' in the plate 56' and at its other end 53' in a sleeve 105 having bushings 136 and journalled on the plate 3', is rotated by suitable means as by the pulley 106. This arbor has a gear 107 clamped thereon as by the bolts 108 which compress the gear's split hub 109. A carrier designated generally 135, is carried by this arbor, its hub portion 110 rotatably bearing on the sleeve, and is rotated by suitable means, as by the rotatable element, the worm 39', which meshes with the worm wheel 38' carried by said hub portion. Suitable means is also provided for holding the carrier against rotation, as this worm and worm wheel, or the swingable catch 111 pivotally mounted at 112 on the crank portion 113 of the arbor, and adapted to holdingly engage by its bifurcated extremity 114 straddling an upwardly or downwardly extending rib 57' or 57² of the stationary plate 56'; this catch may be employed in the absence of said worm and worm wheel, in which case the carrier may be rotated by the crank portion 113. This carrier has a casing portion comprising lateral sections 115 and 116 detachably connected as by the bolts 117, and also by the connecting members 118, 119 detachably secured to the sections respectively as by bolts 120. The saws 16', 17' are rotatably mounted on the carrier, having respectively shafts 121, 122 carrying gears 123, 124 inside the casing, the connecting members 118, 119 being located adjacent the shafts of the saws, and when removed uncovering the gears 123, 124. The saws' shafts have their bearings in the ball bearing blocks 125, 126, which are turnable in eccentric bearings in split ball-bearing socket members 127, 128, themselves revoluble in bearings 130, 131 axially parallel with the arbor's axis.

These socket members 127, 128 are clamped against such rotation by the connecting members 118, 119 under the action of their securing bolts 120. When such clamping action is released by loosening said bolts, these socket members 127, 128 may be severally turned as by a tool inserted through the slots 132 in the connecting members 118, 119 and engaging in suitable pits 133 in the socket members. It will be seen that the axes of the saws may be thus shifted as may be desired to adjust the same.

It is readily understood that rotatable tools other than saws may be employed in place of such saws.

The invention being intended to be pointed out in the claims, is not to be limited to or by details of construction of the particular embodiment thereof hereinbefore described or illustrated in the drawings.

I claim:

1. In a machine of the character described; a rotatable carrier provided with a wheel for rotating the same; saws rotatably mounted on the carrier; means for rotating the saws; a rotatable element adapted to rotate by its rotative movement said wheel and carrier; a second wheel axially-transversely disposed to the axis of said rotatable element and movable into and out of operative contact with said element for rotating the same; means for rotating the second wheel driven by the means for rotating the saws.

2. In a machine of the character described; a rotatable carrier provided with a wheel for rotating the same; saws rotatably mounted on the carrier; means for rotating the saws; a rotatable element adapted to rotate by its rotative movement said wheel and carrier; a lever; a second wheel axially-transversely disposed to the axis of said rotatable element and rotatably carried by the lever and movable by the swinging of the lever into operative connection with said element for rotating the same; means for rotating the second wheel driven by the means for rotating the saws.

3. In a machine of the character described; a rotatable carrier provided with a wheel for rotating the same; saws rotatably mounted on the carrier; means for rotating the saws; disengageable means driven by the means for rotating the saws for rotating and varying the speed of the rotation of the carrier.

4. In a machine of the character described; a rotatable carrier provided with a wheel for rotating the same; saws rotatably mounted on the carrier; means for rotating the saws; a rotatable element adapted to rotate by its rotative movement said wheel and carrier; rotative means, driven by the means for rotating the saws, for rotating the carrier, and axially movable transversely to the axis of said rotatable element into and out of rotative contact therewith.

5. In a machine of the character described; a supporting column having a side with a circular opening therethrough; an arbor extending through said opening and having a bearing on the other side of the column; a carrier mounted on the arbor; saws rotatably mounted on the carrier; a circular closure for said opening carried by the carrier; a detachable plate having a bearing for the arbor and having a plurality of orifices adjacent its edge; means extending through said orifices loosely for securing the plate to the column in edgewise adjustable position, the saws being between the closure and the plate.

In testimony whereof I have hereunto set my hand at Grand Rapids, Michigan, this 17th day of November, 1919.

JOSEPH W. OLIVER.